Aug. 14, 1962 — L. E. GILREATH — 3,048,998
METHOD AND APPARATUS FOR TESTING CASING
Filed April 14, 1958 — 4 Sheets-Sheet 1
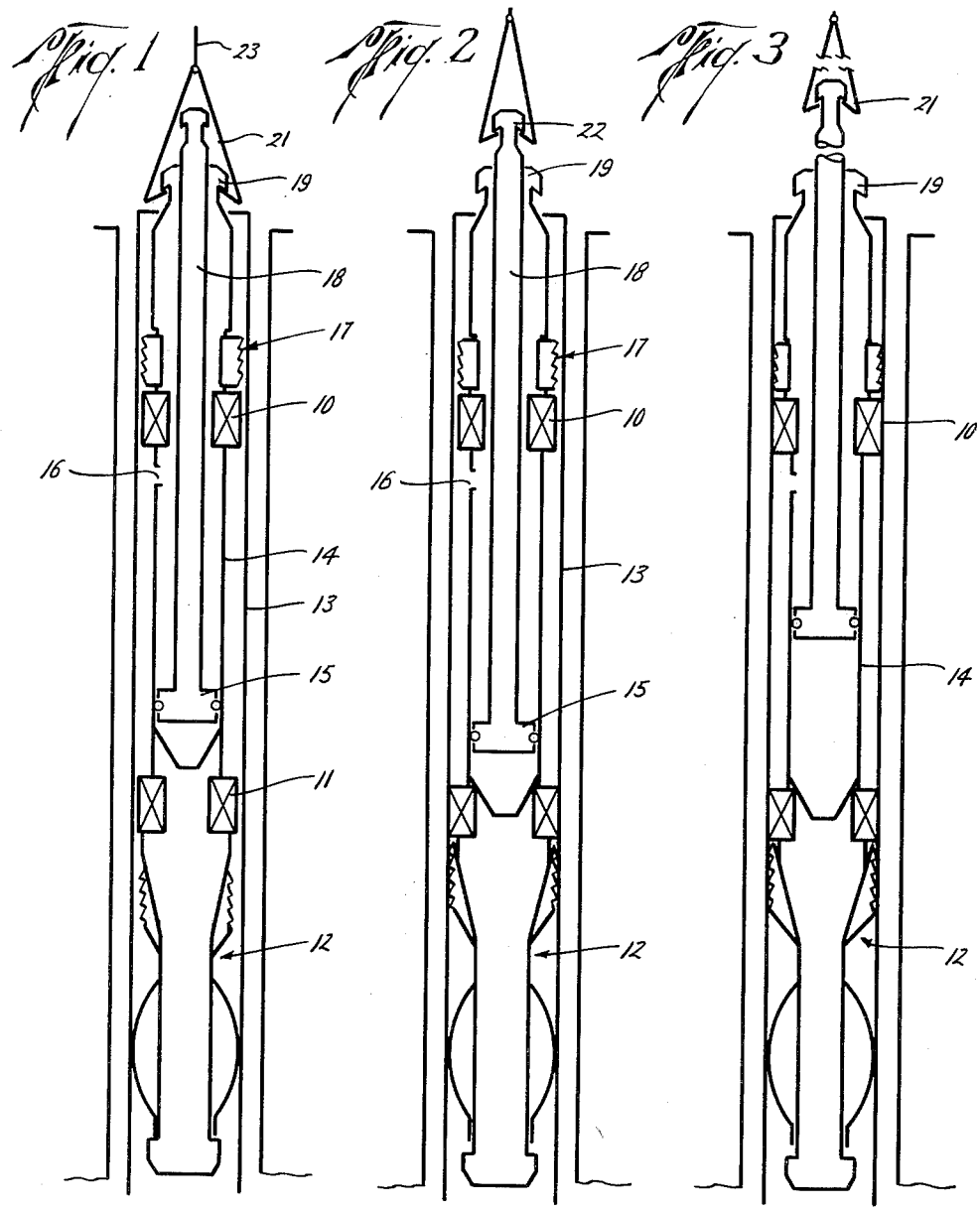
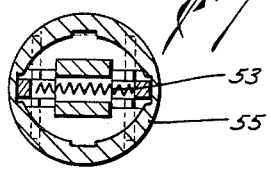
Lafayette E. Gilreath
INVENTOR.
BY J. Vincent Martin
Joe E. Edwards
M. Harvey Gay
ATTORNEYS

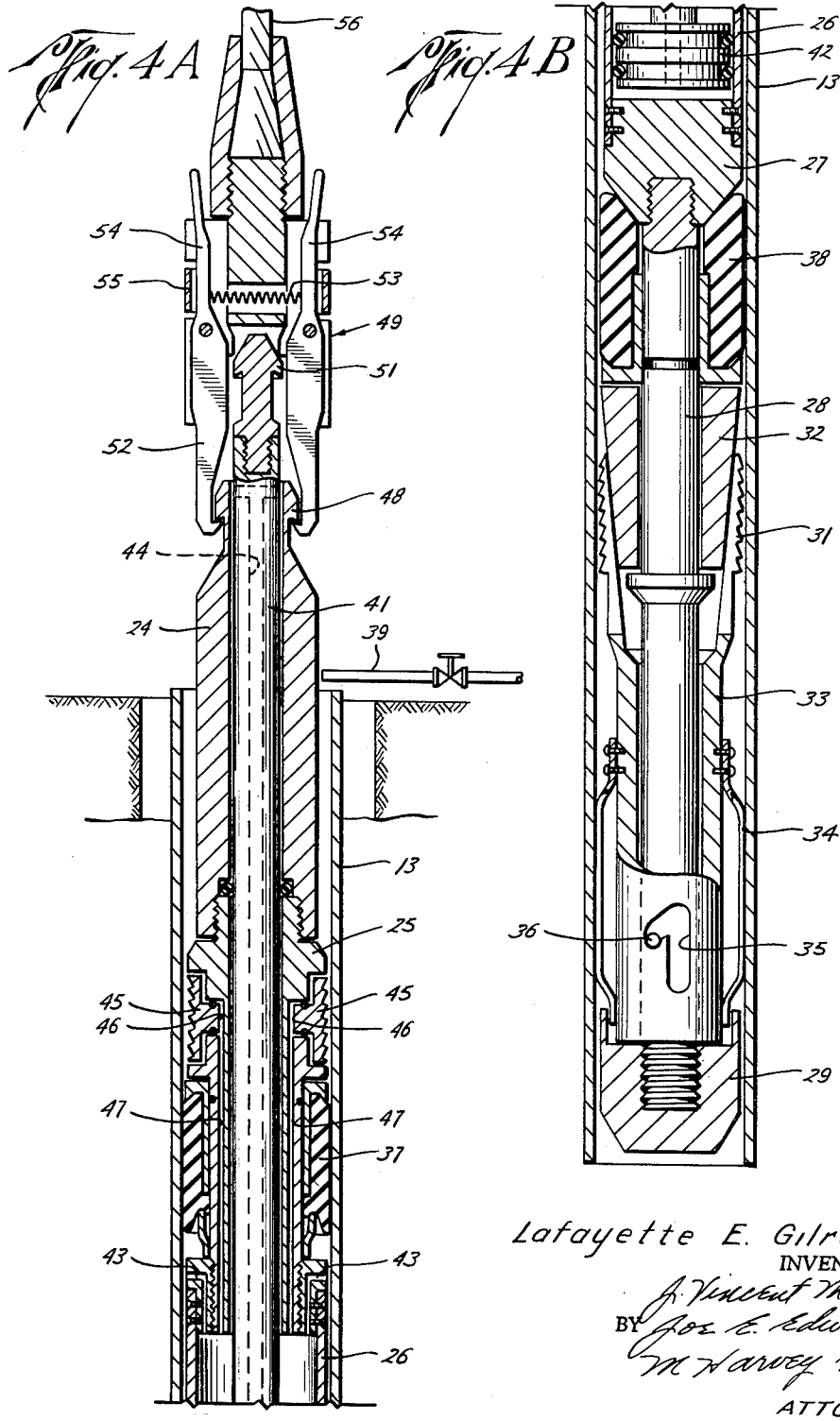

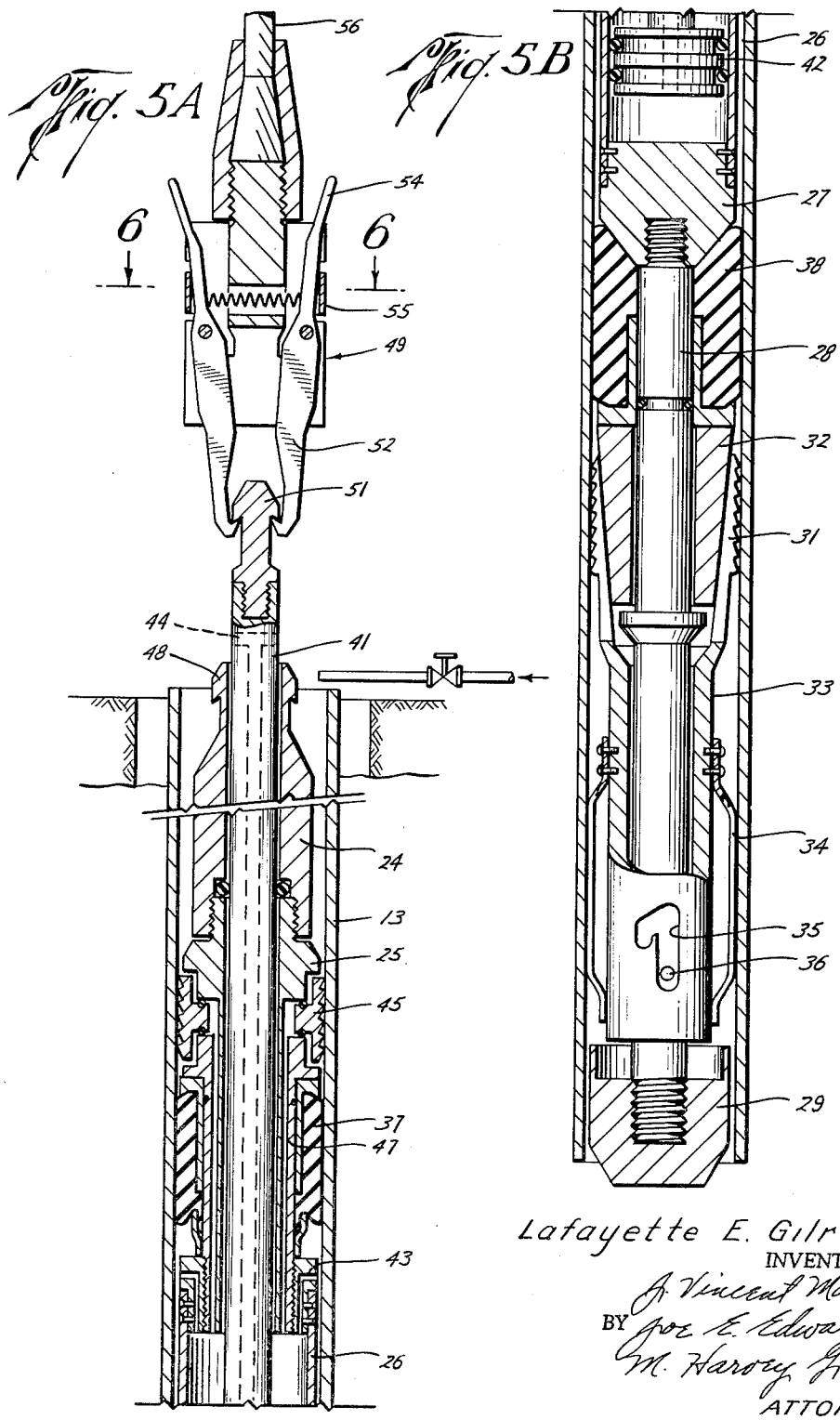

Aug. 14, 1962 L. E. GILREATH 3,048,998
METHOD AND APPARATUS FOR TESTING CASING
Filed April 14, 1958 4 Sheets-Sheet 4
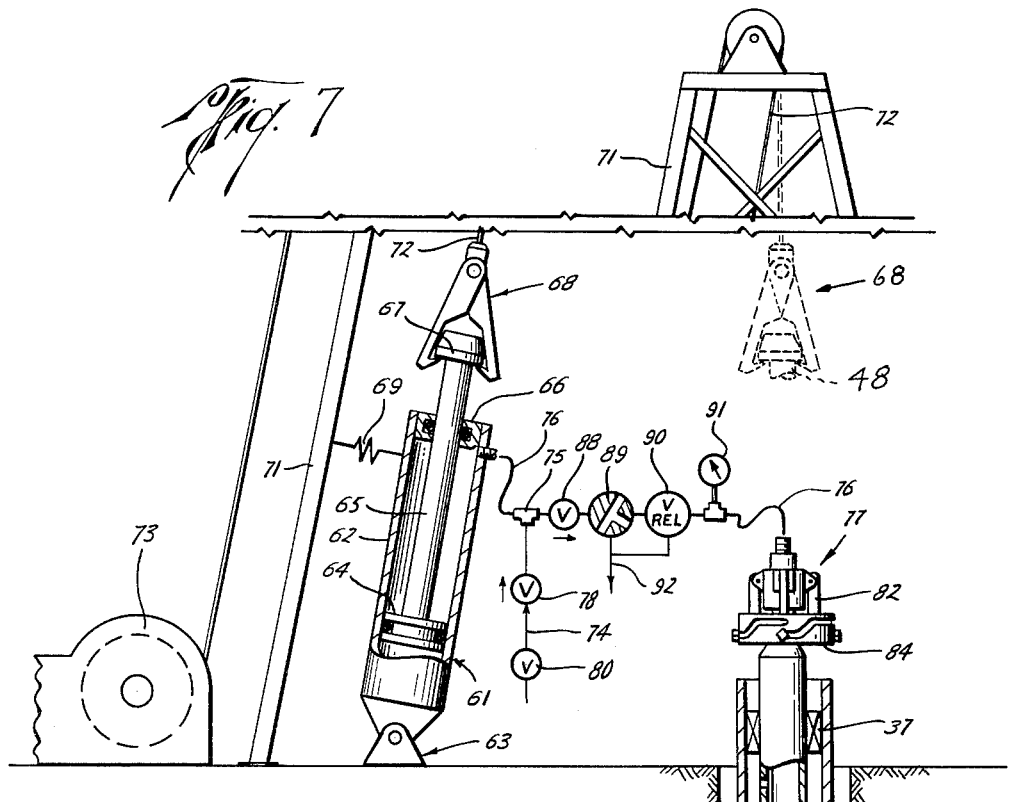
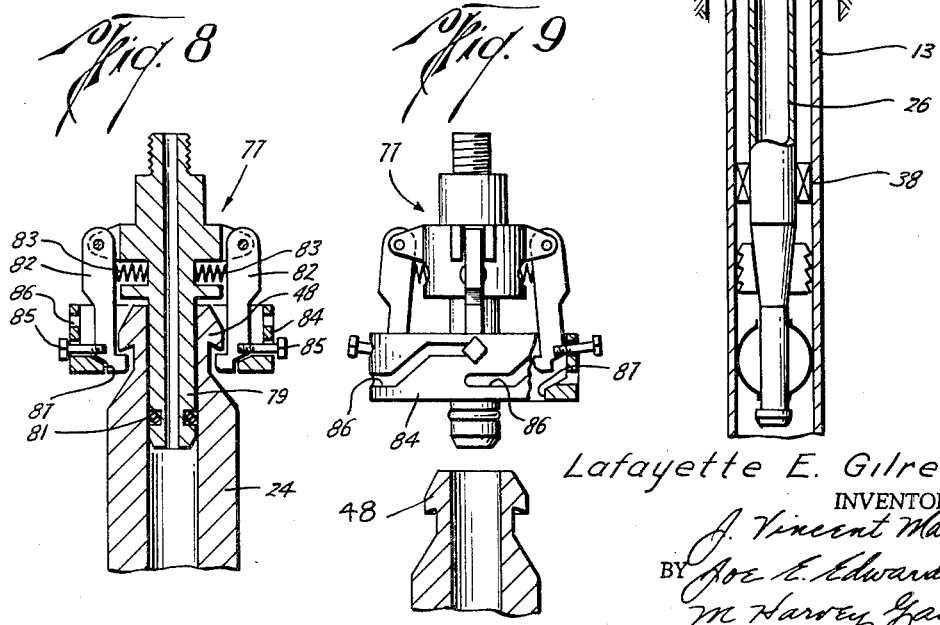
Lafayette E. Gilreath
INVENTOR.
ATTORNEYS

United States Patent Office 3,048,998
Patented Aug. 14, 1962

3,048,998
METHOD AND APPARATUS FOR TESTING CASING
Lafayette E. Gilreath, Houston, Tex., assignor to B. M. Craig and McClelland Wallace, both of Houston, Tex.
Filed Apr. 14, 1958, Ser. No. 728,395
19 Claims. (Cl. 73—40.5)

This invention relates to method and apparatus for testing pipe and more particularly to method and apparatus for testing pipe while it is being run in a well bore.

As well pipe, either casing or tubing, is run in the well bore, it is desirable to test both the pipe and the connecting joints to insure that no leaks are present. Testing in the bore is preferred over pre-testing of pipe as it permits simultaneous testing of the connection between sections of pipe.

Various apparatus have been employed for this purpose in the past and have generally involved a device for packing off a section of the pipe and a highly complicated apparatus for pressuring the packed off section. The prior art devices have required specially equipped trucks to carry out the testing procedure. As these special trucks are very expensive and well pipe is tested only at infrequent intervals, it has been customary in the past for this job to be done by specialized service organizations.

It is an object of this invention to provide a method and apparatus for testing pipe as it is run in a well which utilizes the drawworks to provide power for generating the testing pressure.

Another object is to provide a method and apparatus for testing pipe as it is run in the well in which the necessary equipment is relatively inexpensive and, therefore, may be maintained as general derrick equipment for use when necessary.

Another object is to provide a method and apparatus for testing pipe as it is run in a well in which a sand line of the derrick may be used to operate the pump for generating testing pressure.

Another object is to provide a method and apparatus for testing pipe as it is run in a well in which a sand line of the derrick may be used to operate the pump for generating testing pressure and for manipulating the testing tool within the well pipe.

Another object is to provide a method and apparatus of testing well pipe as it is run in a hole in which the fluid generating pump may be contained within the packed off tool in the pipe to be tested and operated by a line from the drawworks.

Another object is to provide a method and apparatus of testing pipe as it is run in a hole in which the fluid generating pump is carried by the tool within the pipe and the tool is held against movement in either direction by slips which are automatically released upon release of the testing pressure and upward movement of the tool within the well pipe.

Another object is to provide an apparatus for testing pipe as it is run in the hole in which the annulus to be filled with fluid is very small and there is no necessity of employing successively high volume and high pressure pumps.

Another object of this invention is to provide a method and apparatus for testing well pipe as it is run in the hole in which a section of the well pipe is packed off and pressurized by a positive displacement pump secured to the derrick and operated by a line from the drawworks.

Another object is to provide a drawworks operated device for testing pipe as it is run in a well in which suitable valving is supplied for preventing an excess pressure from being applied to the pipe.

Other objects, features and advantages of the invention will be apparent from the drawings, the specification and the claims.

In testing pipe in accordance with this invention, a suitable packoff tool is suspended in the pipe. Pressure is then applied to the packed off section with a positive displacement pump operated by the drawworks.

While a tool constructed as shown in the drawings is preferred, any desired type of tool which will pack off a section of the pipe to be tested may be utilized. Also any desired type of positive displacement pump which can be operated by a drawworks may be utilized.

A well string of tubing is first suspended at the derrick floor by slips set in the turntable of the rotary drilling mechanism. A suitable testing tool is run into the string of pipe and anchored therein in testing position. This is usually done with the sand line of the derrick. Thereafter the sand line is released. The pump for pressurizing the area between the packed off sections of pipe is operated by the drawworks to pressurize the packed off section. This pump may be contained within the tool and operated by attaching the sand line to the operating rod of the pump. Alternatively, the pump may be located on the derrick floor and connected to the well tool through suitable couplings. In the latter instance a line from the drawworks will also operate the pump to pressurize the well tool. Preferably the pump is operated by the sand line which is used to position the tool within the well pipe. It is further preferred that the pump be a piston and cylinder arrangement with the cylinder secured to the derrick floor and the piston operated by a rod having a catching flange for attachment to the sand line.

Testing fluid such as water is supplied to the testing tool and to the pump from any desirable relatively low pressure source. Water is usually available at drilling rigs under approximately 50 lbs. of pressure. Where the form of tool is used in which the pump is within the well tool, the source of testing fluid is dumped into the top of the pipe to be tested. As this fluid will be contained by the bottom packer, it will rise to a level above the upper packer and fill both the pump and the space to be packed off. Thereafter, operation of the pump rod by the sand line will pressurize this fluid and test the section of pipe.

Where the pump is mounted on the derrick floor, the source of testing fluid is connected to the pump testing tool as by being innerconnected with the line between the pump and tool. Thus low pressure fluid will flow into the testing tool to fill it with fluid, if any additional fluid be needed. The low pressure fluid will cause the positive displacement piston to be retracted to a position to begin its power stroke, while filling the pump with fluid to be used in conducting the test. Thereafter the low pressure source of water is isolated from the testing system and the positive displacement pump operated by a line from the drawworks to pressurize the area defined by the testing tool. By noting the reading of a pressure gauge associated with the system, the presence of leaks can be determined.

After the test is completed, utilizing either type of pump, the sand line is disengaged from the pump.

A new stand of pipe is then added to the existing string and lowered into the well and suspended from the turntable in the conventional manner.

The sand line is then run into the lengthened string of pipe, engages the well tool and raises it to a new testing position.

At this time the sand line is reconnected to the pump and a new test conducted. Of course where the pump is is located on the derrick floor, the pump is reconnected to the well tool before conducting the next test.

Referring now to the drawings, wherein illustrative embodiments of well tools and pumps for carrying out the method previously described are disclosed and wherein like reference numerals indicate like parts:

FIGURES 1, 2 and 3 are similar diagrammatic views of a well tool constructed in accordance with this invention, with FIGURE 1 showing the tool being run into the well, FIGURE 2 showing the tool landed and in position for testing, and FIGURE 3 showing the testing pressure being applied to test a section of pipe;

FIGURES 4A and 4B are continuation views partly in vertical cross-section and partly in elevation illustrating the form of device depicted in FIGURES 1 through 3 before landing;

FIGURES 5A and 5B are similar to FIGURES 4A and 4B showing the pump being operated to pressurize the section of pipe packed off by the tool;

FIGURE 6 is a view taken along the lines 6—6 of FIGURE 5A;

FIGURE 7 is a diagrammatic illustration of a form of tool in which the pump is separated from the well tool and mounted on the derrick floor;

FIGURE 8 is a view in vertical cross-section through a fragment of the well tool and the apparatus for connecting the pump with the well tool;

FIGURE 9 is a view similar to FIGURE 8 showing a fragment of the well tool in section and the fitting in elevation with the parts in a position to disconnect the hose from the catching flange of the pump actuator rod.

Referring first to FIGURES 1 through 3, there is shown schematically a tool which may be used in practicing this invention. The tool includes upper and lower packers 10 and 11 for packing off a section of pipe to be tested. A slip assembly 12 is provided for selectively anchoring the testing device in the pipe 13.

A positive displacement pump is provided by coaction of cylinder 14 and piston 15. This pump is in fluid communication with the annulus defined by the upper and lower packers through an opening 16.

As the pump is of the type which will cause an upward component of force on the tool, upper slips indicated generally at 17 are provided for selectively anchoring the tool against upward movement in the pipe. These slips 17 are set by upward movement of the actuator rod 18 for the pump and are released by downward movement of the rod 18. Therefore, they automatically anchor the device against upward movement when the pump is operated.

The upper end of the tool is provided with a latching flange 19. This flange may be engaged by any suitable grappling means 21 for lowering the device into the pipe 13 in the manner shown in FIGURE 1. After the device is in position, the slip assembly is set and the grapple 21 may be disengaged from flange 19 and may then engage a catching flange 22 on the pump operating rod 18. This is shown in FIGURE 2.

Thereafter an upward pull on the rod 18 as shown in FIGURE 3 will cause the upper slips 17 to anchor the device in the pipe and the annulus between the packers to be filled with fluid under pressure to test the pipe for leaks. The presence of leaks is determined by noting any changes in tension in the line 23 which carries grapple 21. Any suitable tensiometer may be employed as will be understood by those skilled in the art.

Reference is now made to FIGURES 4A, 4B, 5A and 5B in which the structure of a well tool which may be employed in the manner explained above is illustrated.

The body of the tool includes, from top to bottom, a lift head sleeve 24, an upper packer mandrel 25, a pump cylinder 26, a pump cylinder base 27, a lower packer and slip mandrel 28, and a mandrel cap 29. These body components may be secured together in any desired manner such as by threaded innerconnections as shown in the drawings.

Mounted on the body and preferably at its lower end is an anchoring means for selectively anchoring the tool in a pipe. This anchoring means should be such as to anchor the tool against downward movement and to be releasable at the will of the operator to move the tool upwardly in the pipe.

The particular anchoring means selected for illustrative purposes includes a plurality of slips 31 which are selectively expanded by cone 32. The slips are mounted on a slip carrier 33 equipped with slip springs 34. The carrier 33 has a jaying slot 35 which cooperates with a lug 36 on the mandrel 28. The lug and jaying slot prevent operation of the anchoring means when it is initially run into the pipe. Thereafter, the lug may be moved into the leg of the jay and the slips set by the weight of the tool and released by an upward pull on the lift head sleeve 22.

Spaced upper and lower packers of any desired form are provided to define a test area within the pipe 13.

The upper packer 37 may be a cup type packer which will permit testing fluid to be introduced between the tool and pipe 13 and flow downwardly past the packer. The lips of the cup type packer will of course prevent reverse flow of liquid when the tool is pressurized. The lower packer 38 may be of the type which is expanded into engagement with the pipe by the weight of the tool when the slip assembly is actuated to anchor the tool in the pipe.

The testing fluid may be introduced into the pipe through conduit 39 and permitted to pass between the pipe and tool as just explained. As an alternative, a valved fill passageway may be provided in the tool and communicate with the area between the upper and lower packers if desired. The construction illustrated is preferred due to its simplicity.

A positive displacement pump of any desired type which can be operated by pulling on the rod 41 is provided. Preferably the pump includes a piston 42 which is mounted within the cylinder 26 and which cooperates therewith to provide a positive displacement pump.

Access between the pump and annulus defined by the upper and lower packers may be provided by a plurality of passages 43 at the upper end of the cylinder. Of course fluid dumped into the top of pipe 13 and flowing past upper packer 31 will find its way into the cylinder through the passages 43 to provide the fluid to be pumped (this fluid has been omitted from the drawings to simplify the illustration). To avoid formation of a vacuum behind the piston 42, a vent passageway 44, shown in dashed lines, extends through the rod 41 and piston 42 to vent the back side of piston 42 to atmosphere.

In this form of tool there will be a tendency for the tool to rise in the pipe with application of pump pressure. To overcome this tendency, a suitable anchoring means may be provided. Preferably this anchoring means is operated by upward movement of the connecting rod 41. The means for anchoring against upward movement may include a plurality of pressure-actuated slips 45 having their pressure responsive surfaces 46 exposed to pressure within cylinder 26 through conduits 47.

The tool is designed to be handled and operated by a line from the derrick. Therefore, the tool is provided with a catching flange 48 adapted to be engaged by the overshot indicated generally at 49. The actuating rod 41 is likewise provided with a catching flange 51 which is also adapted to be engaged by the overshot 49.

The overshot 49 may be of any desired construction. In the form illustrated, the latch arms 52 are urged together by a compression spring 53 between the latch arm handles 54. The throw of the latch arms 52 is determined by the rotative position of a latch ring 55 best shown in FIGURE 6. With the ring in the position illustrated in FIGURE 6, the overshot will engage the flange on the actuating rod 41 only. The latch ring will prevent sufficient inward movement of the latch arms 52 to engage the flange 51 on the operating rod 41. With the ring rotated 90 degrees from the position illustrated in FIGURE 6, the latch arms 52 will engage flange 51.

In the operation of this tool the pipe 13 is first suspended in the well. The tool is then engaged by connecting the overshot to the flange 48 on the upper end of the lift head sleeve. The tool is run into the pipe to test position. As the tool is run in the hole, the lug 36 will be in the position shown in FIGURE 4B and, therefore, the slip assembly will not operate. After the desired depth is reached, the tool is raised and the lug 36 moves into the leg of the jaying slot 35. Thereupon the sand line 56 which carries the overshot may be slacked off and as this occurs, the slip springs 34 will cause the slips 31 to remain stationary, thus permitting the cone 32 to spread the slips into engagement with the wall of the pipe. The weight of the tool will then be exerted by the cylinder base 27 on the lower packing 38 and seal off between the pipe and body of the tool. The overshot may then be released, the ring 55 rotated and the overshot secured to the catching flange 51 on the rod 41. While the overshot is being moved, testing fluid may be introduced through conduit 39 to fill the annulus between the upper and lower packers and the cylinder 26 above piston 42. To avoid airlock problems, the cylinder 26 may have been prefilled at the surface by introducing fluid directly into one of the conduits 43.

It will be noted that the cylinder 26 is designed with a diameter which is only slightly less than the diameter of the pipe 13 and, therefore, of the packers when the packers are set. Thus only a very small amount of fluid is necessary to fill the test annulus. This is desirable as some or all of the fluid exterior of the cylinder and between the upper and lower packers may be lost in shifting the tools between successive testing positions.

After sufficient testing liquid has been introduced into the pipe, the cable 56 is placed in tension to pressurize the fluid within the cylinder 26 and trapped between the upper and lower packers 37 and 38. As this fluid is pressurized, it will be forced through the passageways 47 and be effective upon the upper anchoring slips 45 which will engage the pipe and prevent upward movement of the tool during the test.

Any suitable tensiometer may be applied to the line 56 and by noting whether or not the tension in the line remains constant, it may be determined whether there are any leaks within the section of pipe 13 being tested.

After the test is completed, the overshot is released from the actuating rod 41 which will return to the position shown in FIGURE 4B due to the back pressure of fluid which was compressed, the weight of the rod and piston, and the weight of fluid above the piston and within the cylinder 26.

After the test is completed, an additional stand of pipe may be added to the string and lowered into the well. The overshot is then run into the new stand of pipe and engages the catching flange 48 on the tool and the tool is lifted to a new testing position. Of course as the tool is lifted, the cone 32 is pulled from behind the slips 31, thereby releasing the lower slip assembly. After the tool has been raised to a new testing position, it is reset and the testing operation repeated.

Referring now to FIGURES 7, 8 and 9, there is shown an alternative form of device for practicing this invention. This device differs basically from that shown in FIGURES 4A, 4B, 5A and 5B in that the pump is located on the derrick floor. However, it is still operated by a line from the drawworks.

The well tool employed with the form of the invention may be identical with the tool shown in FIGURES 4A and 4B with the piston 42 and the actuating rod 41 removed. Therefore, the tool is shown schematically in FIGURE 7.

Testing fluid is supplied to the tool from a positive displacement pump such as the piston type pump indicated generally at 61. This pump includes a cylinder 62 which is pivotally mounted to the floor of the derrick by a mounting assembly indicated generally at 63. A piston 64 is secured to an actuating rod 65 which extends to the exterior of the cylinder 62 through a suitable stuffing box. The rod 65 terminates in a catching flange 67 designed for attachment to the overshot indicated generally at 68. A suitable resilient means such as spring 69 between the cylinder and one of the derrick legs holds the cylinder in a position substantially parallel to the derrick leg 71. This spring permits the cylinder to align itself with the sand line 72 when this line is taken in by the drawworks 73.

Drilling rigs are customarily provided with a source of water under about 50 lbs. of pressure, and this source is connected to the piston through line 74. Preferably the line 74 is connected through a T 75 to the line 76 which innerconnects the pump and the well tool. This line 76 communicates with the upper end of cylinder 62 and terminates in a fitting indicated generally at 77 for connecting to the well tool. A suitable check valve 78 is provided in the fluid supply line 74 to prevent back flow of fluid when the pump applies pressure to the well tool.

The fitting for connecting the line 76 to the well tool may take any desired form. The fitting shown in FIGURES 8 and 9 is preferred. This fitting includes a boss 79 insertable into the bore through the sleeve 24 and provided with a suitable seal such as O-ring 81 to seal therewith.

The fitting is provided with depending latch arms 82 which are urged outwardly by springs 83. These arms are contained within a ring 84 and each arm carries a pin 85 which projects through a serpentine slot 86 in the ring 84. One slot is provided for each arm. By comparison of FIGURES 8 and 9, it will be noted that when the ring 84 is rotated to position the pins in the lower section of the slot, the latch arms 82 will be held in a position to engage the catching flange 48 on sleeve 24 and hold the fitting on the well tool. The latch arms are held against outward movement by engagement with a ledge 87 on the interior of the ring 84. When the ring is rotated to move the pins into the upper section of the serpentine slots, the ring will move downwardly relative to the latch arms and the latch arms 82 will be free of the ledge 87 and, therefore, may move outwardly due to springs 83. This will permit the fitting to be released from the testing tool.

Arranged in series in the line 76 between the pump and the well tool, there is a check valve 88 for holding a back pressure on fluid trapped between the spaced seals 37 and 38, a three-way control valve 89, a relief valve 90, and a pressure gauge 91. The operation of these elements will more fully appear in the description of the operation of this form of the invention.

After the well tool has been run in and landed in the pipe to be tested in the manner heretofore explained, the overshot is attached to the catching flange 67 of the pump 61. The shut-off valve 80 is opened to flood the pump and drive piston 65 to fully retracted position as well as fill the cylinder 26 and the space defined by the upper and lower packers 37 and 38. At this time the three-way valve 89 will be positioned to confine flow to the conduit 76. Thereafter the sand line 72 is placed in tension by operation of the drawworks 73 to pressurize the fluid confined by the upper and lower packers 37 and 38.

The relief valve 79 may be set to relieve pressure above any predetermined amount. Then if an excess pressure is applied by the pump 61, this excess pressure will be relieved through this valve. By noting the pressure gauge 91 to determine if pressure within the testing tool remains constant, the presence or absence of leaks may be determined.

After a section of pipe has been tested, the three-way valve is operated to relieve the pressure to outlet 92. At this time the valve 80 will be closed to avoid waste of testing fluid.

The fitting 77 is then released from the testing tool. An additional stand of pipe may then be secured to the pipe 13 and lowered into the well. Thereafter the overshot 68 may be run into the new stand of pipe to engage the testing tool and raise it to a new testing position. After the tool is in position, the overshot may be re-engaged with the pump, the valve 80 controlling incoming fluid opened, and the cycle repeated.

From the above it will be seen that all of the objects of this invention have been attained. There has been provided a very simple form of testing tool which is inexpensive to manufacture and which may be operated from the power present on the drilling rig. It may, therefore, be retained at the well as a part of regular rig equipment. The particular tool used may be designed so that the pump is either inside of the pipe or mountable on the derrick floor. It is, of course, apparent that the mounting means 63 may provide for detachment of the pump so that it may be stored in an out-of-the-way position when not needed.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. Apparatus for testing pipe suspended in a well comprising, a body, means for anchoring the body against downward movement in a pipe to permit temporary suspension of the apparatus, spaced seal means on the body for sealing between the body and a pipe in which the apparatus is suspended, a portion of said body providing a pump cylinder, a port in the upper section of the pump cylinder providing communication between the interior of the pump cylinder and the annulus defined by said seals, a piston positioned within and having a sliding seal with said pump cylinder, a rod extending from the piston upwardly through the body, and a sliding seal between the body and rod whereby test pressure may be applied to the pipe by an upward pull on the rod forcing fluid in the pump cylinder into said annulus defined by said seals.

2. Apparatus for testing pipe suspended in a well comprising, a body, means for anchoring the body against downward movement in a pipe to permit temporary suspension of the apparatus, means for releasably anchoring the body against upward movement, spaced seal means on the body for sealing between the body and a pipe in which the apparatus is suspended, a portion of said body providing a pump cylinder, a port in the upper section of the pump cylinder providing communication between the interior of the pump cylinder and the annulus defined by said seals, a piston positioned within and having a sliding seal with said pump cylinder, a rod extending from the piston upwardly through the body, and a sliding seal between the body and rod whereby test pressure may be applied to the pipe by an upward pull on the rod forcing fluid in the pump cylinder into said annulus defined by said seals, upward movement of said rod energizing the means for anchoring the body against upward movement.

3. Apparatus for testing pipe suspended in a well comprising, a body, means for anchoring the body against downward movement in a pipe to permit temporary suspension of the apparatus, pressure operated means for releasably anchoring the body against upward movement, spaced seal means on the body for sealing between the body and a pipe in which the apparatus is suspended, a portion of said body providing a pump cylinder, a fluid passageway connecting the upper end of said cylinder with said pressure operated means, a port in the upper section of the pump cylinder providing communication between the interior of the pump cylinder and the annulus defined by said seals, a piston positioned within and having a sliding seal with said pump cylinder, a rod extending from the piston upwardly through the body, and a sliding seal between the body and rod whereby test pressure may be applied to the pipe and fluid pressure may be applied to the pressure operated means by an upward pull on the rod forcing liquid in the pump cylinder into said annulus defined by said seals and against said pressure operated means.

4. Apparatus for testing pipe suspended in a well comprising, a body, slip means operable by downward movement of the body to anchor the apparatus against downward movement and releasable by upward movement of the body to permit upward movement of the apparatus, spaced seal means on the body for sealing between the body and a pipe in which the apparatus is suspended, pump means provided by a cylinder carried by the body and a relatively movable piston mounted in the cylinder, a port in the upper end of the cylinder providing communication between the cylinder and the annulus defined by said seals, second releasable slip means for anchoring the apparatus against upward movement, and means including a rod connected to the piston and extending through the upper end of the body and having a sliding seal therewith, said rod accessible from the upper end of the tool for operating the pump and the second releasable slip means by an upward pull on the rod to set the second slip means and apply test pressure to the pipe.

5. The apparatus of claim 4 wherein the second slip means are pressure operated by fluid from said pump upon upward movement of said rod.

6. The apparatus of claim 4 wherein a pulling flange is provided on the body for raising the body and a second pulling flange is provided on the rod for raising the rod.

7. In a system for pressurizing pipe as it is run in a well bore and wherein a derrick provided with a drawworks is positioned over the well bore, a testing tool adapted to be suspended in a pipe in the well bore and provided with spaced seals and a fluid passageway interconnecting the exterior of the tool intermediate the seals with the upper end of the tool, and a piston type pump having a fluid connection with the testing tool and having one of its cylinder and piston secured to the derrick and the other provided with means for attachment to a line operated by the drawworks to pressurize the testing tool by operation of the drawworks to take in said line.

8. In a system for pressurizing pipe as it is run in a well bore and wherein a derrick provided with a drawworks is positioned over the well bore, a testing tool adapted to be suspended in a pipe in the well bore and provided with spaced seals and a fluid passageway interconnecting the exterior of the tool intermediate the seals with the upper end of the tool, slip means carried by the testing tool and operable upon downward movement of the testing tool and releasable upon upward movement of the testing tool to prevent downward movement of the tool while permitting upward movement of the tool through each newly added stand of pipe, and a piston type pump having a fluid connection with the testing tool and having one of its cylinder and piston secured to the derrick and the other provided with means for attachment to a line operated by the drawworks to pressurize the testing tool by operation of the drawworks to take in said line.

9. In a system for pressurizing pipe as it is run in a well bore and wherein a derrick provided with a drawworks is positioned over the well bore, a testing tool adapted to be suspended in a pipe in the well bore and provided with spaced seals and a fluid passageway interconnecting the exterior of the tool intermediate the seals with the upper end of the tool, and a positive displacement pump having a fluid connection with the testing tool and an operating rod provided with means for attachment to a line operated by the drawworks to pressurize the testing tool by operation of the drawworks to take in said line.

10. In a system for pressurizing pipe as it is run in a well bore and wherein a derrick provided with a drawworks is positioned over the well bore, a testing tool adapted to be suspended in a pipe in the well bore and provided with spaced seals and a fluid passageway interconnecting the exterior of the tool intermediate the seals with the upper end of the tool, and a positive displacement type pump having a fluid connection with the testing tool and mounted on the derrick floor, said pump provided with an operating member having means for attachment to a line operated by the drawworks to pressurize the testing tool by operation of the drawworks to take in said line.

11. The system of claim 10 wherein the connection between the pump and testing tool includes a relief valve to avoid exerting excessive pressure on the testing tool.

12. The system of claim 10 wherein the connection between the pump and testing tool includes, a relief valve to avoid exerting excessive pressure on the testing tool, a check valve for holding pressure on the pipe, a gauge to measure such pressure, a three-way valve downstream of the check valve for releasing pressure on the tool, and a source of low pressure fluid upstream of said check valve for returning the pump to a position to begin its power stroke and filling the pump with fluid.

13. In a system for pressurizing pipe as it is run in a well bore and wherein a derrick provided with a drawworks is positioned over the well bore, a testing tool adapted to be suspended in a pipe in the well bore and provided with spaced seals and a fluid passageway interconnecting the exterior of the tool intermediate the seals with the upper end of the tool, and a piston type pump having a fluid connection with the testing tool and having one of its cylinder and piston secured to the derrick and the other provided with a catching flange adapted to be releasably engaged by an overshot on the sand line of the derrick whereby the tubing may be pressurized by taking the sand line in the drawworks, said testing tool having a similar catching flange to permit use of the sand line to raise the testing tool in the pipe.

14. Apparatus for testing pipe suspended in a well comprising, a cylindrical body, spaced seal means on the body for sealing between the body and a pipe in which the apparatus is suspended, said cylindrical body having a diameter almost equal to the diameter of the seal means when sealing between the body and a pipe, and positive displacement pump means having a fluid connection with the annulus defined by said seals and body, said pump means operated by means having a catching flange adapted to be releasably engaged by an overshot on a line operated by the drawworks with which pipe is being run into a well whereby the drawworks may be used to apply test pressure to the pipe.

15. The method of testing pipe as it is run in a well bore comprising, packing off a section of the bore through the pipe, pressurizing the packed off section with a positive displacement pump, and operating the pump with a line from the drawworks of the derrick utilized in running the pipe by taking in the line on the drawworks.

16. The method of testing pipe as it is run in a well bore comprising, packing off a section of the bore through the pipe, pressurizing the packed off section with a piston operated pump, and relatively reciprocating the piston and cylinder of the pump during the power stroke with a sand line of the derrick utilized in running pipe.

17. The method of testing pipe as it is run in a well bore comprising, suspending the pipe to be tested in a well bore, packing off a section of the bore through the pipe with a well tool, pressurizing the packed off section with a positive displacement pump, operating the pump with a line from the drawworks of the derrick utilized in running the pipe by taking in said line on the drawworks, releasing said line from the pump, adding a stand of pipe to the well string and lowering the new stand into the well bore, running said line through the newly added stand and attaching the line to the tool for packing off the section of pipe, raising said tool with said line to a new testing position and releasing said line and reattaching it to the pump to operate the pump during the next testing cycle.

18. The method of testing pipe as it is run in a well bore comprising, packing off a section of the bore through the pipe with a well tool supported on slips which prevent downward movement of the tool, pressurizing the packed off section and simultaneously pressurizing hydraulically operated hold-down slips to prevent upward movement of the well tool with a positive displacement pump, and operating the pump with a line from the drawworks of the derrick utilized in running the pipe by taking in said line on the drawworks.

19. The method of testing pipe as it is run in a well bore comprising, packing off a section of the bore through the pipe, pressurizing the packed off section with a piston type pump, filling the pump with liquid from a low pressure source to move the pump piston to a position to begin the power stroke and provide testing liquid, and operating the pump during the power stroke with a line from the drawworks of the derrick utilized in running the pipe by taking in the drawworks.

References Cited in the file of this patent

UNITED STATES PATENTS

| | | |
|---|---|---|
| 1,744,698 | Granger | Jan. 21, 1930 |
| 2,652,717 | Bush et al. | Sept. 22, 1953 |
| 2,836,250 | Brown | May 27, 1958 |